United States Patent
Taylor

(10) Patent No.: US 9,134,162 B2
(45) Date of Patent: Sep. 15, 2015

(54) MAGNETIC LEVEL INDICATOR

(75) Inventor: Christopher Ellis Taylor, Denham Springs, LA (US)

(73) Assignee: Magnetrol International, Incorporated, Aurora, IL (US)

( * ) Notice: Subject to any disclaimer, the term of this patent is extended or adjusted under 35 U.S.C. 154(b) by 828 days.

(21) Appl. No.: 13/168,222

(22) Filed: Jun. 24, 2011

(65) Prior Publication Data

US 2012/0324996 A1    Dec. 27, 2012

(51) Int. Cl.
G01F 23/00    (2006.01)
G01F 23/02    (2006.01)
G01F 23/72    (2006.01)

(52) U.S. Cl.
CPC ............... *G01F 23/02* (2013.01); *G01F 23/72* (2013.01)

(58) Field of Classification Search
CPC ........ G01F 23/36; G01F 23/363; G01F 23/72
USPC ............................................. 73/305, 309, 313
See application file for complete search history.

(56) References Cited

U.S. PATENT DOCUMENTS

| | | | | |
|---|---|---|---|---|
| 1,388,151 A * | 8/1921 | Ohaver | | 73/325 |
| 1,619,919 A * | 3/1927 | Cook | | 73/299 |
| 1,791,349 A * | 2/1931 | Carey | | 73/747 |
| 2,620,662 A * | 12/1952 | Henderson | | 73/323 |
| 3,420,103 A * | 1/1969 | Peschek | | 73/319 |
| 3,964,312 A * | 6/1976 | Sebek | | 73/314 |
| 4,457,171 A * | 7/1984 | Gebauer | | 73/305 |
| 4,512,190 A * | 4/1985 | Sledmere | | 73/319 |
| 4,987,777 A * | 1/1991 | Bourret et al. | | 73/328 |
| 5,323,653 A * | 6/1994 | Gruett | | 73/326 |
| 5,988,701 A * | 11/1999 | Wu | | 285/197 |
| 6,282,952 B1 * | 9/2001 | Kawolics | | 73/325 |
| 6,435,026 B1 * | 8/2002 | Donehue | | 73/314 |
| 2002/0014118 A1* | 2/2002 | Wech | | 73/323 |
| 2003/0037613 A1* | 2/2003 | Mulrooney et al. | | 73/323 |
| 2003/0196488 A1* | 10/2003 | Mann et al. | | 73/313 |
| 2007/0157725 A1* | 7/2007 | Fling et al. | | 73/313 |
| 2012/0036927 A1* | 2/2012 | Sanders et al. | | 73/291 |

OTHER PUBLICATIONS

Orion Instruments, "A Guide to Selecting the the Right Magnetic Level Indicator", Jul. 2003, found at http://www.cbeng.com/resources/whitepaper/selectingtherightmli.pdf, entire document.*
Orion Instruments, A Magnetrol Company—"A New Generation in Magnetic Level Indication", pp. 1-12. Bulletin IRI—100.4 Effective Dec. 2006; Copyright © 2011.

* cited by examiner

*Primary Examiner* — Hezron E Williams
*Assistant Examiner* — Rodney T Frank
(74) *Attorney, Agent, or Firm* — Wood, Phillips, Katz, Clark & Mortimer

(57) ABSTRACT

A magnetic level indicating system includes a chamber for fluidic coupling to a process vessel. Material level in the vessel equalizes with material level in the chamber. A magnetic float in the chamber rises and falls with the material level in the chamber. A magnet actuated visual indicator is mounted to the chamber for indicating level of the magnet in the chamber and thus material level in the vessel. The indicator comprises an elongate transparent tubular housing defining an interior space open at opposite ends. An indicator assembly is mounted in the housing interior space and responsive to movement of the float and visible through the housing to indicate material level in the chamber. An end cap is received in each of the opposite ends of the tubular housing and a seal member is disposed between each end cap and the tubular housing.

16 Claims, 7 Drawing Sheets

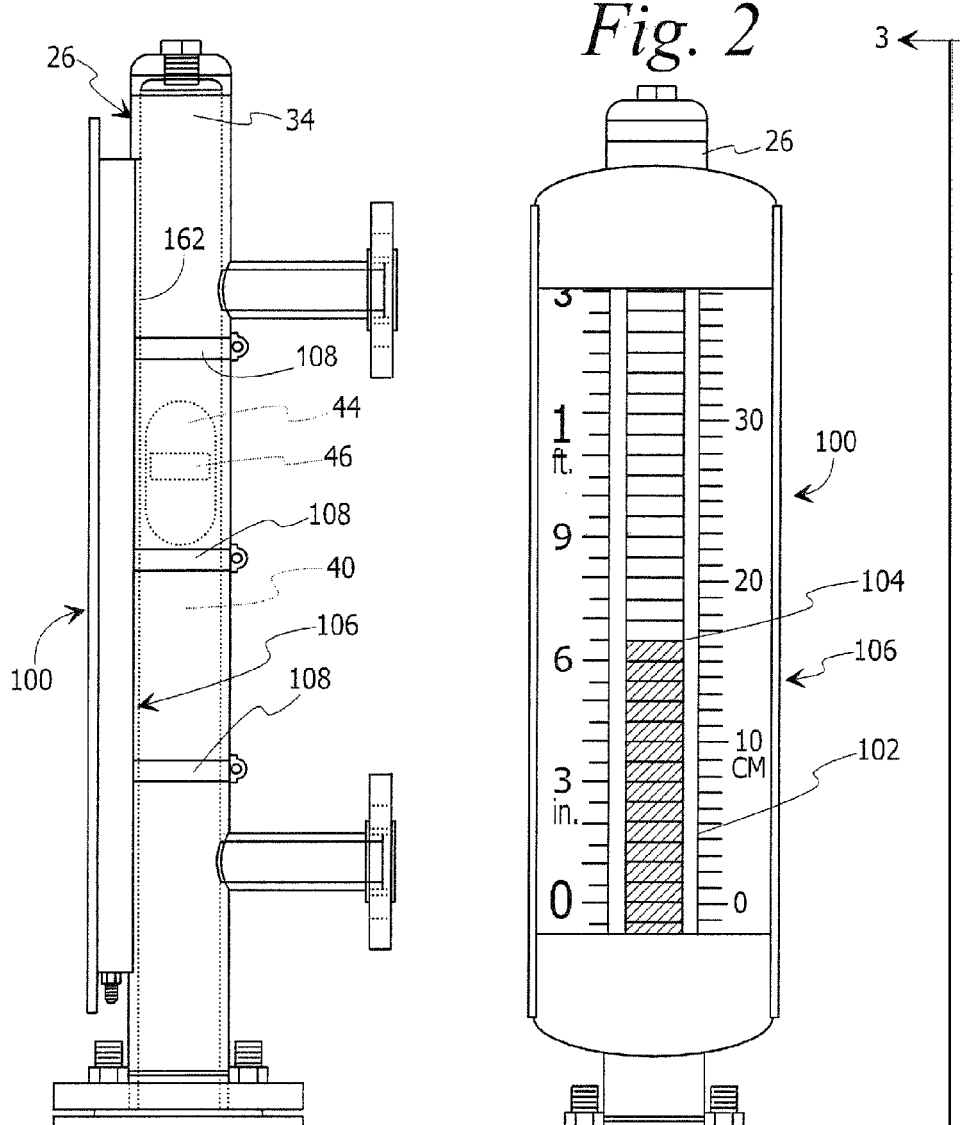
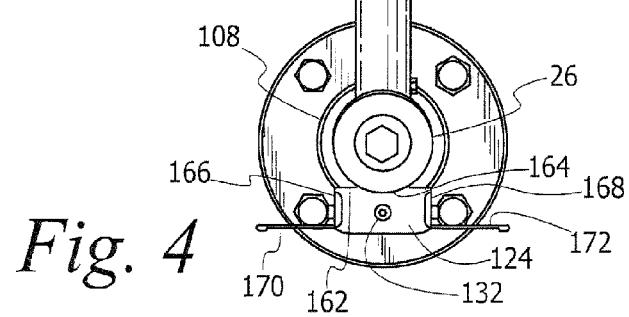

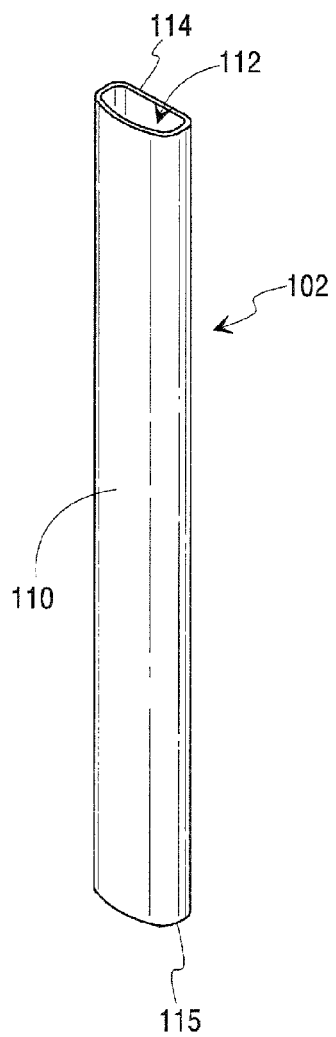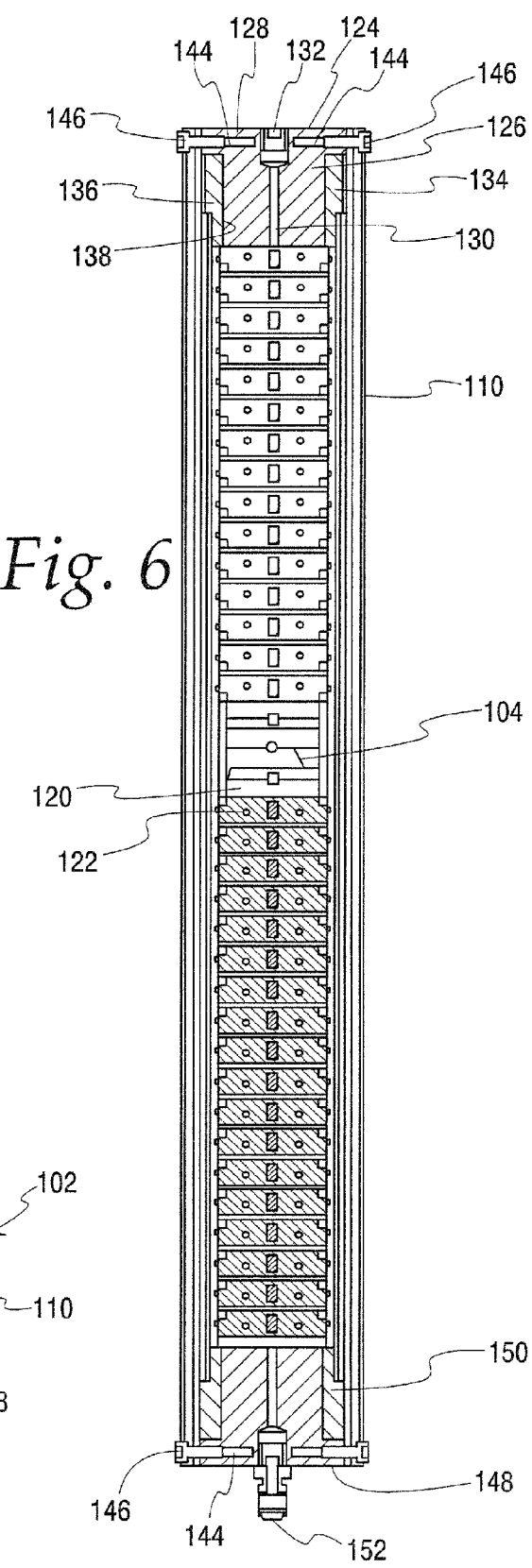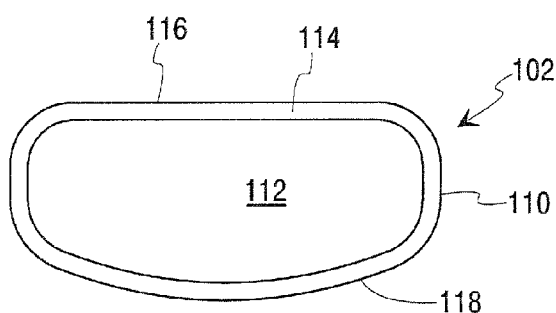
Fig. 6
Fig. 7
Fig. 8

MAGNETIC LEVEL INDICATOR

CROSS-REFERENCE TO RELATED APPLICATIONS

There are no related applications.

SUMMARY OF THE INVENTION

This invention relates to a magnetic level indicator and, more particularly, to an improved indicator housing design.

BACKGROUND OF THE INVENTION

Numerous technologies exist for measuring level of liquids or solids in an industrial process environment. Among these is a magnetic level indicator. A magnetic level indicator is constructed of a non-magnetic chamber, a float and a visual indicator. The chamber, also known as a cage or piping column, is essentially a pipe or similar device external to a process tank or vessel. The chamber is usually mounted vertically and is usually connected to the tank through two or more horizontal pipes. One of the horizontal pipes is near the bottom of the chamber and the other is near the top of the chamber. This arrangement allows the material level in the chamber to equalize with the material level in the tank, largely isolating the cage from agitation, mixing or other activities in the tank. The chamber can be isolated from the tank using valves. The float is sized and weighted for the specific gravity and pressure of the application and contain magnets which actuate a visual indicator on the outside of the chamber to indicate level.

A visual indicator in one known form comprises an elongate housing defining a rear wall and opposite side walls. End caps provide a top wall and a bottom wall. The housing has a front opening. A flag type indicator assembly or a shuttle type indicator assembly is contained in the housing. A rectangular flat bezel indicator covers the front opening. The visual indicator is clamped on the chamber. The individual flags or the follower contain an alignment magnet which couples with the float magnets as the float moves up or down within the chamber. Float movement rotates the flags and changes their color or, in the case of a follower, moves the follower to the point of the level, as is known.

The flat bezel is typically of a transparent material and printed with indicia representing a measuring scale for material level. The position of the follower or the point at which the flags change color represents true level. True level is indicated or read by the corresponding point on the measuring scale. To keep condensation out of the housing it is necessary that the housing be sealed. A Schrader valve is then used to provide a dry nitrogen backfill. The flat bezel must be sealed along its circumference including the side edges and opposite ends. This type of seal is an extremely difficult seal to achieve, particularly in the four square corners where the bezel and the end caps meet. Generally, a reliable seal can only be achieved using some form of caulking or adhesive. Additionally, any flexing or twisting of the housing that occurs during assembly can cause the two seals along the length of the bezel to release allowing a loss in positive purging pressure of dry nitrogen.

The traditional flat bezel design also requires that there be some sort of locking/holding component to secure it to the housing. This may be a channel in the side walls. There must be sufficient material or thickness to provide a sufficient amount of strength to hold the flat bezel in position. This requirement causes the indicator assembly to be positioned to the rear of the housing thus limiting the indicator viewing angle.

The present invention is directed to overcoming one or more of the problems discussed above in a novel and simple manner.

SUMMARY OF THE INVENTION

Broadly, there is disclosed herein a magnetic level indicating system including a chamber for fluidic coupling to a process vessel. Material level in the vessel equalizes with material level in the chamber. A magnetic float in the chamber rises and falls with the material level in the chamber. A magnet actuated visual indicator is mounted to the chamber for indicating level of the magnet in the chamber and thus material level in the vessel. The indicator comprises an elongate transparent tubular housing defining an interior space open at opposite ends. An indicator assembly is mounted in the housing interior space and responsive to movement of the float and visible through the housing to indicate material level in the chamber. A pair of end caps are each received in one of the opposite ends of the tubular housing and a seal member is disposed between each end cap and the tubular housing.

It is a feature of the invention to provide a valve mounted to one of the end caps and adapted to hermetically seal the housing.

It is another feature of the invention that the housing is of generally oval cross section. The housing may be of a generally D-shaped cross section and have a generally planar rear wall and a front wall of a generally parabolic cross section.

It is yet another feature of the invention that the housing has a width greater than its depth.

It is a further feature of the invention that the housing comprises a clear tube, such as glass or polycarbonate.

It is an additional feature of the invention to provide a bracket operatively secured to the end caps and including means for clamping the bracket to the chamber. The bracket includes indicia representing a measuring scale for material level.

Further features and advantages of the invention will be readily apparent from the specification and from the drawings.

BRIEF DESCRIPTION OF THE DRAWINGS

FIG. 2 is a front elevation view of a magnetic level indicator in accordance with a first embodiment of the invention;

FIG. 3 is a side elevation view taken along the line 3-3 of FIG. 2;

FIG. 4 is a top plan view of the magnetic level indicator of FIG. 2;

FIG. 6 is a front elevation view of a tubular housing and indicator assembly of the magnetic actuated visual indicator of FIG. 5;

FIG. 7 is a perspective view of the tubular housing;

FIG. 8 is a top plan view of the tubular housing;

DETAILED DESCRIPTION OF THE INVENTION

Figure 1:
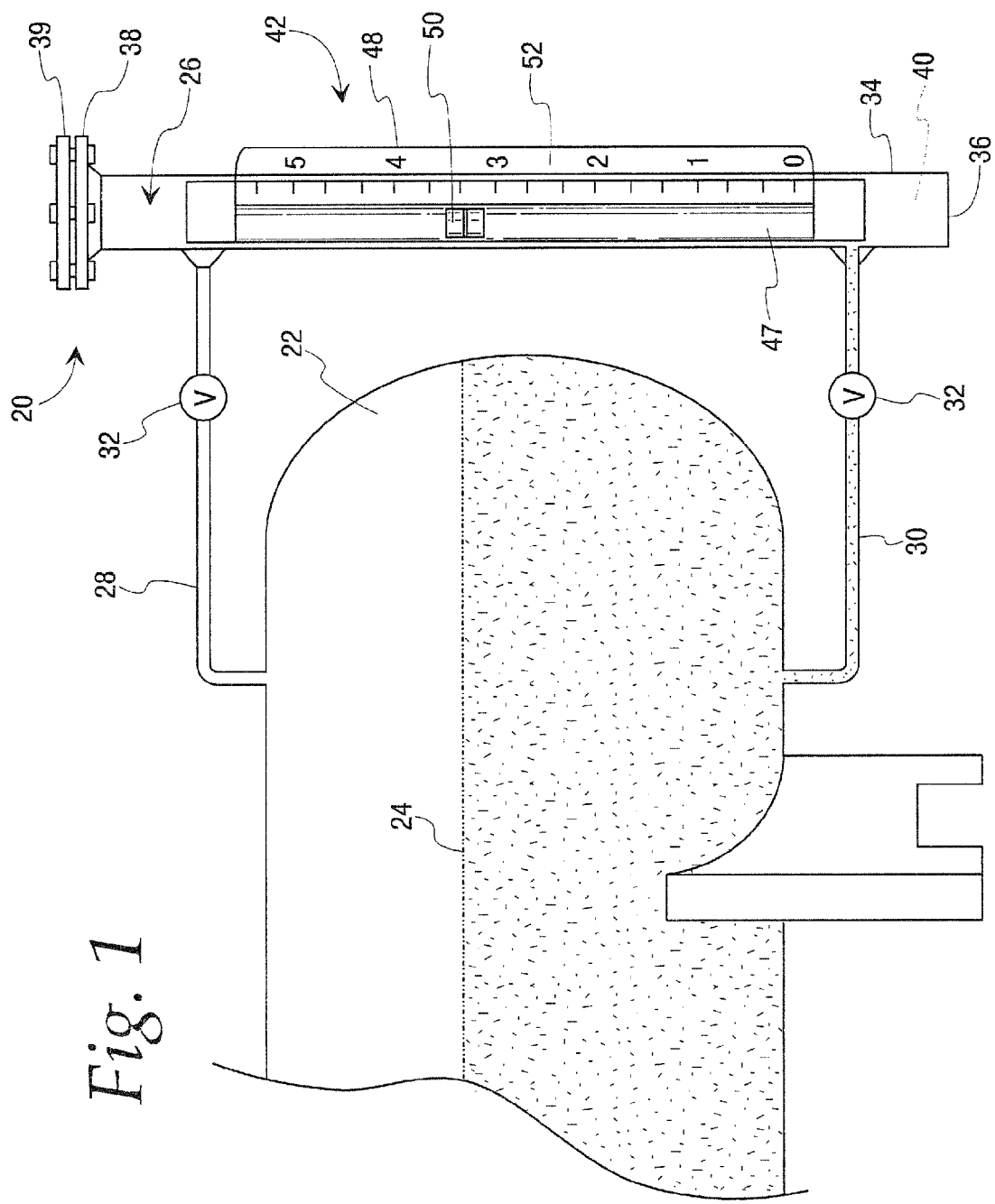
FIG. 1 is an elevation view of a magnetic level indicator in accordance with the invention mounted to a process vessel.

FIG. 1 shows a magnetic level indicating system 20, also referred to as a magnetic level indicator (MLI), in accordance with the invention. The magnetic level indicating system 20 is used for providing level measurement of a tank or vessel 22 having a material 24, the level of which is to be sensed. The magnetic level indicating system 20 includes a chamber 26 for fluidic coupling to the vessel 22 via a first horizontal pipe 28 near the top of the vessel 22 and a second horizontal pipe 30 near the bottom of the vessel 22. The vessel 22 can be isolated from the chamber 26 using valves 32 in each of the top pipe 28 and the bottom pipe 30.

The chamber 26 comprises a non-magnetic elongate pipe 34 closed at a bottom 36 and having a top flange 38 closed by a plate 39 to define an interior space 40. The described arrangement allows the material level in the vessel 22 to equalize with level in the chamber 26 while largely isolating the chamber 26 from agitation, mixing or other activities in the vessel 22.

As will be apparent, the design of the chamber 26 is for illustration only and differs in some of the figures. The magnetic level indicating system 20 may be used with various different chamber designs.

The magnetic level indicating system 20 also a magnet actuated visual indicator 42 and a float 44, see FIG. 3, in the chamber interior space 40. The float 44 rides up and down in the chamber 26 at the surface of the material 24. The float 44 is typically hollow so that it rides freely on the surface of the material 24. The float 44 may be made of stainless steel or the like and houses a magnet 46 adapted to be positioned at the surface of the material 24. As such, the float 44 is also referred to herein as a magnetic float. The float 44 is sized and weighted for the specific gravity and pressure of the application.

A typical MLI uses a visual indicator of either the rotating flag type or shuttle type. As described below, the features of the present invention can be used with both types. The visual indicator 42 in FIG. 1 is of the shuttle type and is only generally illustrated and discussed herein to provide an understanding of its operation relative to the float 44. The features of the present invention are described in greater detail with respect to the embodiments in the subsequent figures.

The visual indicator 42 is strapped to the chamber 26 and is totally isolated from the process material 24. The visual indicator 42 includes a housing 47, also referred to as a bezel, a faceplate 48 and a shuttle indicator 50. The shuttle indicator 50 follows the float magnet 46 and rides up and down within the housing 47. The faceplate 48 includes graduated markings 52 and thus functions as a ruler to indicate level of the material 24.

Referring to FIGS. 2-4, a magnetic actuated visual indicator 100 in accordance with a first embodiment of the invention is illustrated for mounting to the chamber 26. The visual indicator 100 comprises an elongate transparent tubular housing 102. An indicator assembly 104 is mounted in the tubular housing 102 to indicate material level in the chamber 26. A faceplate bracket 106 supports the housing 102 and mounts the indicator 100 to the chamber 26 using clamps 108.

Referring to FIGS. 7 and 8, the housing 102 comprises an elongate tube 110 made of a transparent material such as glass or polycarbonate, or the like. The tube 110 defines an interior space 112 open at a top end 114 and at an opposite bottom end 115. The tube 110 has a generally oval cross section. Advantageously, the tube 110 has a generally planar rear wall 116 and a front wall 118 that is of a generally parabolic cross section to provide an overall generally D-shaped cross section, as shown in FIG. 8. Particularly, the front wall 118 has a width greater than its depth with the front being closer to planar and having only a slight curve.

In the first embodiment of the invention, the indicator assembly 104 comprises a conventional flag type indicator assembly. The indicator assembly 104 includes thirty-six individual flags, two of which are labeled as 120 and 122, see FIG. 6. Each flag contains an alignment magnet (not shown) which couples with the float magnets 46 as the float 44 moves up or down within the chamber 26. As is known, each flag has one color on a front side and a different color on a rear side. Float movement rotates the flags 120 and 122, as well as the unnumbered flags. Thus, the flags below the float 44 will show the one color and the flags above the float 44 will show the different color. The position at which the flags change color represents true level. As is apparent, the exact number of flags is dependent on the overall length of the tube 110 in accordance with the range of level to be sensed.

The tube top end 114 is closed by a top end cap 124. The top end cap 124 includes a tubular neck 126 of a size and shape to be received in the tube 110. A flange 128 is provided atop the neck 126. The flange 128 and neck 126 include a through opening 130 for receiving a plug 132. A seal member 134 is disposed between the top end cap 124 and the tube top end 114 to provide an air tight seal. The seal member 134 is tubular having a larger upper end 136 and a narrower lower end 138. The lower end 138 is of a size to be snugly received in the tube top end 114 and to provide a seal therewith. A through opening 140 is of a size corresponding to the top end cap neck 126 to provide a seal therewith. The top end cap 124 may be formed, for example, of plastic. The seal member 134 is formed of a resilient material such as rubber or the like. Openings 144, one of which is shown, are provided on opposite sides of the flange 128 for receiving fasteners 146, discussed below. The seal member 134 is tightly received in the tube top end 114. The top end cap 124 is in turn tightly received in the seal member through opening 140, as shown in FIG. 6.

A bottom end cap 148 and bottom seal member 150 are generally similar to the top end cap 124 and top seal member 134, discussed above, for sealing the tube bottom end 115. The bottom end cap 148 is adapted to receive a spring operated Schrader valve 152 of conventional construction, rather than the plug 132. The Schrader valve 152 is used to provide a dry nitrogen backfill into the housing interior space 112. The seal members 134 and 150 seal the respective end caps 124 and 148 within the tubular housing 102 to provide a reliable, hermetic seal and prevent entry of moisture into the housing interior space 112. Alternatively, the seal members 134 and 150 could be replaced by one or more O-rings, or the like, surrounding the end caps 124 and 148.

The bracket 106 comprises a formed metal plate 160. In the illustrated embodiment of the invention, the bracket 106 is formed from a single piece of metal. As is apparent, the bracket 106 could be formed from multiple pieces appropriately secured together. Likewise, the bracket 106 could be formed of materials other than metal. The metal plate 160 has a generally planar rear wall 162 with a slightly curved central portion 164. The plate 160 is turned forwardly at opposite sides of the rear wall 162 to provide a left side wall 166 and a right side wall 168. The plate 160 is turned outwardly at a front of the left side wall 166 to provide a left front wall 170. The plate 160 is turned outwardly at a front of the right side wall 168 to provide a right front wall 172. Spacing between the side walls 166 and 168 is selected to receive the width of the tubular housing 102. The depth of the side walls 166 and 168 is selected to accommodate the depth of the tubular housing 102. The center wall curved portion 164 is provided to allow the bracket plate 160 to seat on the cylindrical chamber 26, as shown in FIG. 4. The left and right front walls walls 170 and 172 define faceplates or rulers printed with indicia 174 and 176, respectively, representing a measuring scale for material level. In the illustrated embodiment of the invention, the left faceplate indicia 170 is in feet and inches, while the right faceplate indicia 176 is in centimeters. The indicia 174 and 176 can be printed directly on the bezel faceplates 170 and 172, respectively, or be adhesively applied thereto. Moreover, the faceplates 170 and 172 could be ruler holders or the like for supporting removable rulers.

Figure 5:
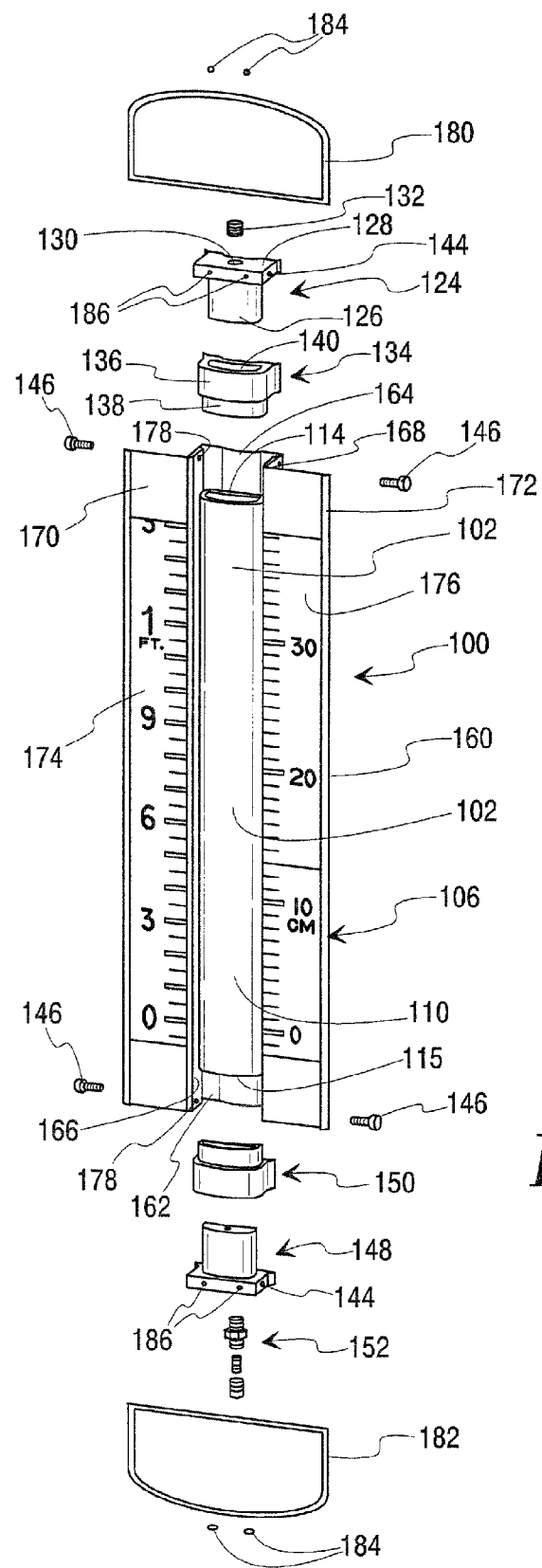
FIG. 5 is an exploded view of a magnetic actuated visual indicator of the magnetic level indicator of FIG. 2.
Figure 9:
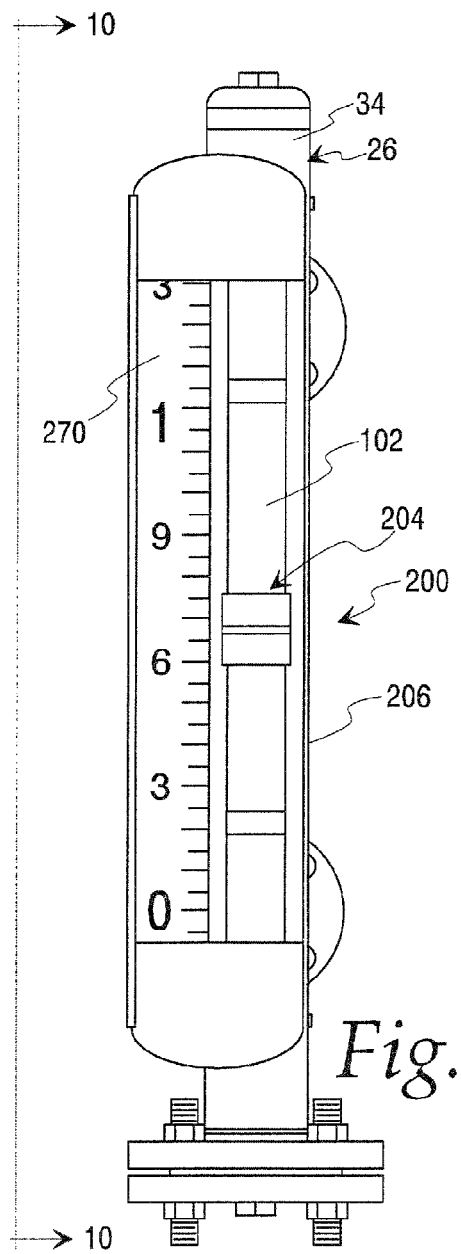
FIG. 9 is a front elevation view of a magnetic level indicator in accordance with a second embodiment of the invention.
Figure 10:
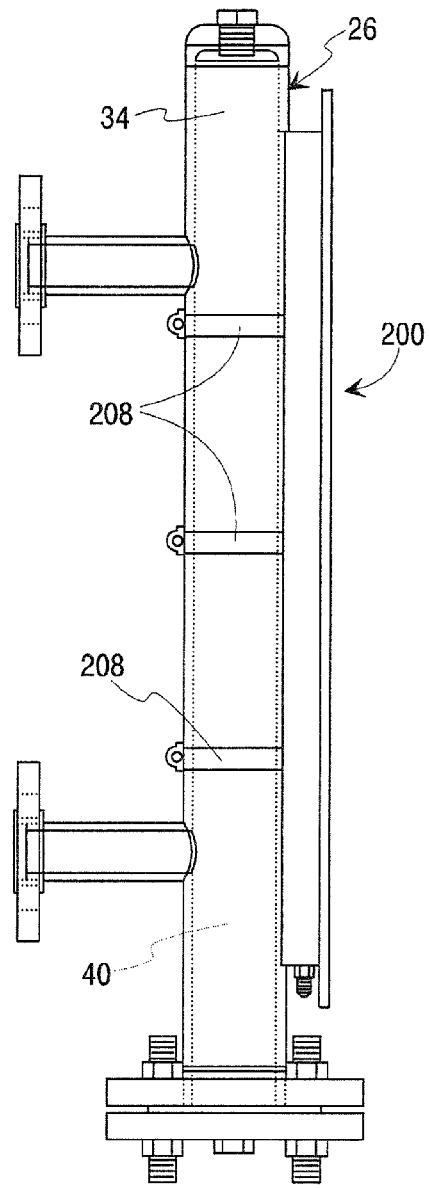
FIG. 10 is a side elevation view taken along a line 10-10 of FIG. 9.
Figure 11:
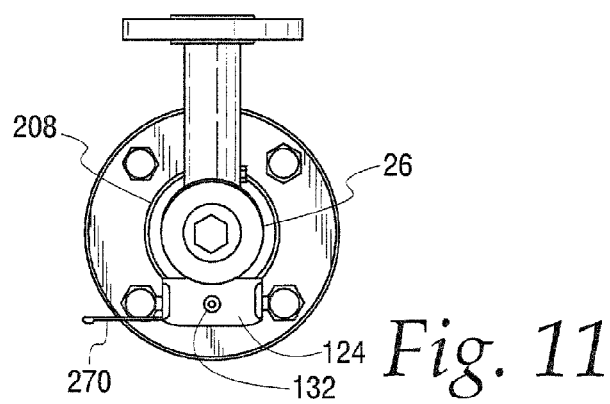
FIG. 11 is a top plan view of the magnetic level indicator of FIG. 9.
Figure 12:
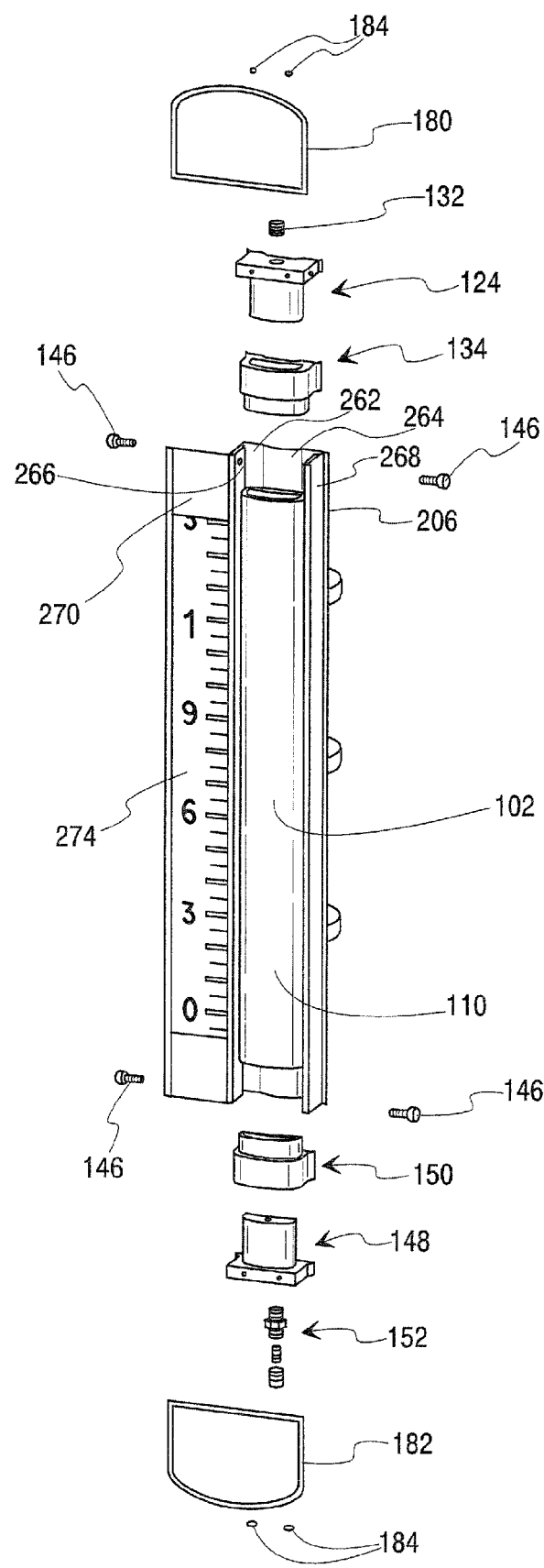
FIG. 12 is an exploded view of a magnet actuated visual indicator of the magnetic level indicator of FIG. 9.
Figure 13:
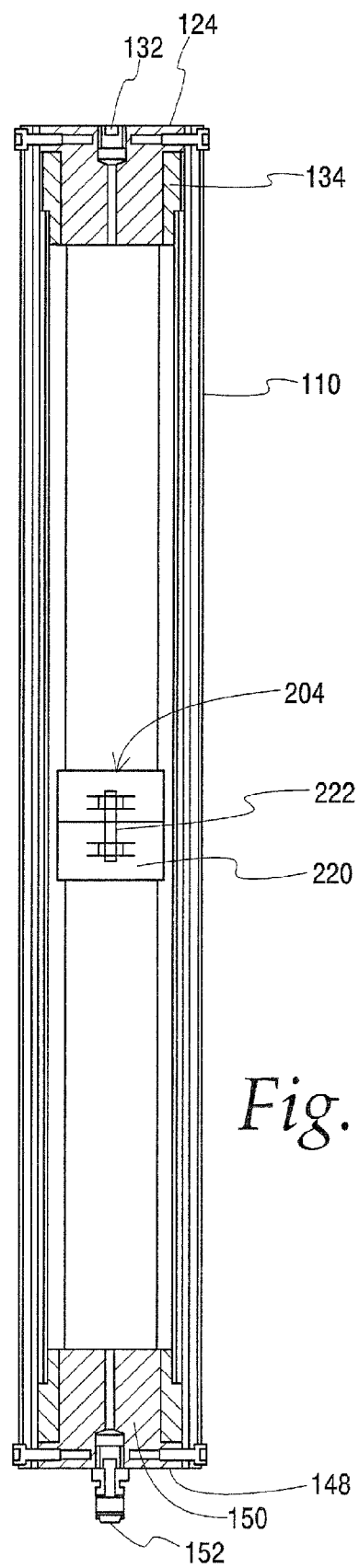
FIG. 13 is a front elevation view of a tubular housing and indicator assembly of the magnetic actuated visual indicator of FIG. 12.

The side walls 166 and 168 are provided with apertures 178 at opposite ends, two of which are shown in FIG. 5, for receiving the fasteners 146. The fasteners 146 extend through the bracket apertures 178 and are threaded into the threaded openings 144 in the end caps 124 and 148 to secure the indicator 100 in assembled relationship. A top name plate 180 and a bottom name plate 182 are also secured using threaded fasteners 184 to the respective end caps 124 and 148 through threaded openings 186.

The clamps 108 pass through slots (not shown) in the bracket rear wall 162 to clamp the visual indicator 100 to the chamber 26, as generally shown in FIG. 3.

The tubular housing 102 having a planar rear wall 116 allows the indicator assembly 104 to be positioned as close to the chamber 26 and thus the float 44, as possible. This enhances magnetic coupling. Likewise, the closure housing 102 being wider at the front than it is deep, provides a wider viewing angle without distorting view of the indicator assembly 104. This provides an overall structure which is relatively flat and of minimal depth while maintaining a wider viewing angle.

Referring to FIGS. 9-13, a magnet actuated visual indicator 200 in accordance with a second embodiment of the invention is illustrated. The indicator 200 includes a tubular housing 102, as with the first embodiment, housing a shuttle type indicator assembly 204. For simplicity herein, elements similar to those discussed relative to the first embodiment are used with similar numbers, albeit in the 200 series, while identical elements use the identical reference numerals. The tubular housing 102 is secured to a bracket 206 including a faceplate 270 on only one side, as discussed below.

The shuttle type indicator assembly 204 is of conventional construction and comprises a follower 220 containing an alignment magnet 222 which couples with the float magnets 46 as the float 44 moves up or down within the chamber 26. Float movement moves the follower 220 to the point of level. The position of the follower 220 represents true level.

The bracket 206 differs from the bracket 106 in that it only includes a single front faceplate 270 on the left side including indicia 274. This provides a single measuring scale or ruler. As is apparent, the bracket 206 could include a faceplate on the right, such as in FIG. 1, rather than the left, as necessary, or desired. Otherwise, the second embodiment of the visual indicator 200 is substantially similar to the visual indicator 100, discussed above.

As is apparent, in accordance with the invention, a modular component system is provided in which a single type of tubular housing 102 can be used with different types of indicator assemblies and with different faceplate configurations. Also, the faceplates can be changed at any time without changing the tubular housing or indicator assembly if, for example, the scale to be measured changes.

A benefit of the D-shaped, generally oval tubular housing 102 is that it encompasses the sealing reliability of a circular tube. Additional benefits of the tubular housing 102 is that it allows for the indicator flags to be positioned as closely to the float as possible and allows for a wide viewing angle over traditional MLI flag/shuttle indicator designs.

Particularly, this design benefits from use of a tubular housing design compared to a flat bezel design due to the gas permeability of the seal material. As previously mentioned, the flat bezel design must seal along both lengths of the indicator bezel as well as at the circumference of each indicator end. With a tubular housing design, the sealing surface consists only of the circumference of the ends of the tubular housing. This provides an exponentially lower sealing surface area, allowing for decreased positive pressure to escape in order to hold a dry nitrogen purge for an extended period of time (when compared to flat glass).

The D-shaped, generally oval tubular housing 102 positions the flags as close to the float as possible (via the flattened rear wall). A circular tube design would require the flags to be centered within the circular tube to allow adequate clearance for the flags to spin freely, to minimize flag rail movement within the tube and to allow for the smallest diameter tube to be utilized. The planar rear wall of the D-shaped tube allows for the indicator flags to be positioned in an ideal location as close to the MLI float as possible.

The D-shaped, generally oval tubular housing 102 provides for increased viewing angle compared to a circular shaped housing. A circular housing would require the indicator assembly to be positioned at the approximate centerline of the circular housing. This would set the flag viewing surface farther back into the housing thus limiting viewing angle of the flag surface.

A benefit of the bracket design is that it can use ruler holders and removable rulers which enhances functionality of the overall product. The ruler can be added to and removed from the ruler holders as needed. With the dual ruler holders, the possible configurations will include single left, single right, dual (left and right) and none.

Thus, in accordance with the invention, there is provided a magnetic level indicator including improved sealing characteristics and functional features enhancing versatility.

I claim:
1. A magnetic level indicator comprising:
a chamber for fluidic coupling to a process vessel whereby material level in the vessel equalizes with material level in the chamber;
a magnetic float in the chamber for rising and falling with material level in the chamber; and
a magnet actuated visual indicator mounted to the chamber for indicating level of the magnet in the chamber comprising an elongate transparent tubular housing defining an interior space open at opposite ends, a flag type indicator assembly mounted in the housing interior space and responsive to movement of the float and visible through the housing to indicate material level in the chamber and means for closing the opposite ends of the tubular housing to seal the interior space, wherein the tubular housing has a generally parabolic cross section with a generally planar rear wall, with a width greater than its depth to minimize distance between the indica- tor assembly and the magnetic float and to provide a wider viewing angle of the indicator assembly.

2. The magnetic level indicator of claim 1 wherein the closing means comprises a pair of end caps each received in one of the opposite ends of the tubular housing and a seal member disposed between each end cap and the tubular housing.

3. The magnetic level indicator of claim 2 further comprising a valve mounted to one of the end caps and adapted to hermetically seal the housing.

4. The magnetic level indicator of claim 1 wherein the housing is of a generally D-shaped cross section.

5. The magnetic level indicator of claim 1 wherein the housing comprises a polycarbonate tube.

6. The magnetic level indicator of claim 1 wherein the housing comprises a glass tube.

7. The magnetic level indicator of claim 1 further comprising a bracket operatively secured to the tubular housing and including means for clamping the bracket to the chamber.

8. The magnetic level indicator of claim 7 wherein the bracket comprises indicia representing a measuring scale for material level.

9. The magnetic level indicator of claim 7 wherein the closing means comprises a pair of end caps each received in one of the opposite ends of the tubular housing and the bracket is secured to the end caps.

10. In a magnetic level indicating system including a chamber for fluidic coupling to a process vessel whereby material level in the vessel equalizes with material level in the chamber and a magnetic float in the chamber for rising and falling with material level in the chamber, an improved magnet actuated visual indicator mounted to the chamber for indicating level of the magnet in the chamber comprising:

an elongate transparent tubular housing defining an interior space open at opposite ends;

a flag type indicator assembly mounted in the housing interior space and responsive to movement of the float and visible through the housing to indicate material level in the chamber, wherein the tubular housing has a generally parabolic cross section with a generally planar rear wall, with a width greater than its depth to minimize distance between the indicator assembly and the magnetic float and to provide a wider viewing angle of the indicator assembly; and a pair of end caps each received in one of the opposite ends of the tubular housing and a seal member disposed between each end cap and the tubular housing.

11. The improved magnet actuated visual indicator of claim 10 further comprising a valve mounted to one of the end caps and adapted to hermetically seal the housing.

12. The improved magnet actuated visual indicator of claim 10 wherein the housing is of a generally D-shaped cross section.

13. The improved magnet actuated visual indicator of claim 10 wherein the housing comprises a polycarbonate tube.

14. The improved magnet actuated visual indicator of claim 10 wherein the housing comprises a glass tube.

15. The improved magnet actuated visual indicator of claim 10 further comprising a bracket operatively secured to the end caps and including means for clamping the bracket to the chamber.

16. The improved magnet actuated visual indicator of claim 15 wherein the bracket comprises indicia representing a measuring scale for material level.

\* \* \* \* \*